(12) United States Patent  (10) Patent No.: US 7,428,994 B1
Jeffway, Jr. et al.  (45) Date of Patent: Sep. 30, 2008

(54) TOY ADAPTING TO COLOR OF SURROUNDINGS

(76) Inventors: Robert W. Jeffway, Jr., 37 Front St., Leeds, MA (US) 01063; Steven R. Casino, 28 Warren Rd., Maplewood, NJ (US) 07040

( * ) Notice: Subject to any disclaimer, the term of this patent is extended or adjusted under 35 U.S.C. 154(b) by 550 days.

(21) Appl. No.: 11/149,273

(22) Filed: Jun. 10, 2005

(51) Int. Cl.
| G06K 7/10 | (2006.01) |
| G06K 7/14 | (2006.01) |
| G06K 7/12 | (2006.01) |
| A63F 9/24 | (2006.01) |
| A63F 13/00 | (2006.01) |
| A63F 3/00 | (2006.01) |
| G06F 17/00 | (2006.01) |
| G06F 19/00 | (2006.01) |
| A63H 30/00 | (2006.01) |
| A63H 33/26 | (2006.01) |
| G09B 19/00 | (2006.01) |
| F21V 21/08 | (2006.01) |
| F21V 5/00 | (2006.01) |
| A44C 1/00 | (2006.01) |
| A44C 5/00 | (2006.01) |
| F21S 4/00 | (2006.01) |

(52) U.S. Cl. ................... 235/454; 235/469; 235/462.04; 463/31; 273/237; 446/175; 446/485; 434/99; 362/104; 362/571

(58) Field of Classification Search ............ 235/462.04, 235/462.13, 469; 446/175, 219; 434/81, 434/98, 99; 362/104, 571
See application file for complete search history.

(56) References Cited

U.S. PATENT DOCUMENTS

| 5,537,516 | A | * | 7/1996 | Sherman et al. ............... 358/1.9 |
| 6,825,919 | B2 | * | 11/2004 | Beimers et al. ......... 235/462.13 |
| 6,980,231 | B1 | * | 12/2005 | Ohsawa ...................... 348/188 |
| 2004/0246345 | A1 | * | 12/2004 | Ohsawa et al. ............ 348/222.1 |
| 2005/0153621 | A1 | * | 7/2005 | Gillmour-Bryant et al. . 446/219 |
| 2006/0044559 | A1 | * | 3/2006 | Foy-Watson ................. 356/425 |
| 2006/0219788 | A1 | * | 10/2006 | Thielman et al. ............ 235/454 |
| 2007/0080227 | A1 | * | 4/2007 | Sato ....................... 235/462.13 |

* cited by examiner

*Primary Examiner*—Jared J Fureman
(74) *Attorney, Agent, or Firm*—McNeely Bodendorf LLP

(57) ABSTRACT

A toy or game piece for producing color includes a housing formed in the shape of a toy; a color reader to read a sample and generate data; a processing device to process the generated data and determine a color of the sample based on the generated data; and a light emitting element to produce light corresponding to the determined color. The light emitting element may include two or more light emitting diodes (LEDs) of different colors. The processing device controls the intensity of each LED to cause the light emitting element to produce the corresponding color that is substantially similar to the determined color.

38 Claims, 7 Drawing Sheets

TOY ADAPTING TO COLOR OF SURROUNDINGS

TECHNICAL FIELD

The following description relates generally to toys and in particular to toys for producing color.

BACKGROUND

Color plays a significant role in our daily lives. Colors may be used to convey information or may be used for aesthetic/ornamental applications among others. Children are taught about colors as part of learning and interacting with their surroundings. Therefore, toys often try to utilize color for educational, aesthetic, and entertainment purposes. Although color has been incorporated for use with toys to stimulate, attract, entertain, and teach children, new methods and technology continue to be developed to supplement these traditional toys.

SUMMARY

In one general aspect, a toy for producing color includes: a housing formed in the shape of a toy; a color reader to read a color sample and generate data; a processing device to process the generated data and determine the color of the sample based on the generated data; and a light emitting element to produce colored light corresponding to the determined color. The light emitting element may include two or more light emitting diodes (LEDs) of different colors and the processing device controls the intensity of each LED to cause the light emitting element to produce the colored light corresponding to the determined color.

The color reader may include one or more light emitting diodes (LEDs) to emit light on the sample and a photo detector to measure light reflected and produce the generated data. The processing device is configured to cause the one or more LEDs to emit the light and begin a timer, to stop the timer based on a signal generated by the photo detector, and to determine the color based on the time measured by the timer. The processing device also may be configured to be calibrated by engaging the color reader when placed next to a white color sample, to store the generated data from the white color sample, and to use the stored, generated data to determine the color of the sample.

The housing may be made of a transparent or semi transparent material that allows light to pass through the housing such that when the light emitting device produces a colored light the toy radiates the produced color. The housing may be formed in a shape depicting a creature. The housing also may be shaped in the form of a game piece and the sample may be a colored portion of a game playing surface. The housing also may be shaped in the form of toy jewelry.

The toy may include a user interface to program the processing device and a memory to store color data wherein the memory is one of a card, a stick, and disk and the memory may be inserted in and removed from the toy to change the programming of the toy. The color reader and the light emitting element may both include at least three LEDs, a first LED to emit red light, a second LED to emit green light, and a third LED to emit blue light. In addition, the light emitting element may be a color liquid crystal display. The light emitting element also may include a liquid crystal display that is backlit by two or more color LEDs.

In another general aspect, a toy game system includes: a playing surface comprising one or more colored areas; and a toy game piece. The toy game piece includes a housing; a color reader to generate data based on the color of the one or more colored areas; a processing device to process the generated data and determine the color of the one or more colored areas based on the generated data; and a light emitting element to produce light substantially similar to the determined color. The light emitting element may include two or more light emitting diodes (LEDs) of different colors and the processing device controls the intensity of each LED to cause the light emitting element to produce the corresponding color that is substantially similar to the determined color.

The color reader may include one or more light emitting diodes (LEDs) to emit light on the one or more colored areas and a photo detector to measure light reflected from the one or more areas and produce the generated data. The processing device may be configured to cause the one or more LEDs to emit the light and begin a timer, to stop the timer based on a signal generated by the photo detector, and to determine the color based on the time measured by the timer.

The housing may be formed of a transparent or semi transparent material that allows light to pass through the housing such that when the light emitting device produces a colored light the game piece radiates the produced color.

The game piece may include a user interface to program the processing device and a memory to store color and game data wherein the memory is one of a card, a stick, and disk and the memory may be inserted in and removed from the game piece to change the programming of the game piece.

The color reader and the light emitting element may both include at least three LEDs, a first LED to emit red light, a second LED to emit green light, and a third LED to emit blue light.

The processing device may be configured to give instructions to a user on how to interact with the playing surface.

In another general aspect, a toy for producing color includes a module. The module includes a color reader to read a sample and generate data; a processing device to process the generated color data and determine a color of the sample based on the generated data; an output to provide determined color data; and a housing. The housing includes an input to receive the determined color data; a light emitting element to produce colored light corresponding to the determined color data.

The housing may be formed in the shape of toy jewelry.

The toy also may include toy jewelry including a receptacle wherein the housing is in the form of a jewel to be received in the receptacle of the jewelry.

The housing also may include a second processor to receive the determined color data and to cause the light emitting element to produce the colored light.

The light emitting element may include two or more light emitting diodes (LEDs) of different colors and the processing device controls the intensity of each LED to cause the light emitting element to produce a corresponding color that is substantially similar to the determined color. The light producing element also may include a liquid crystal display that is backlit by the LEDs. The light emitting element also may be a color liquid crystal display.

The input and output may be detachably coupled.

In another general aspect, a toy for producing color includes a module. The module includes a color reader to read a sample and generate data; an output to provide the generated color data; and a housing. The housing includes an input to receive the generated color data; a processing device to process the generated data and determine a color of the sample based on the generate color data; a light emitting element to produce colored light corresponding to the determined color data.

The housing may be formed in the shape of toy jewelry.

The toy also may include jewelry having a receptacle, wherein the housing is in the form of a jewel to be received in the receptacle of the jewelry.

The light emitting element may include two or more light emitting diodes (LEDs) of different colors and the processing device controls the intensity of each LED to cause the light emitting element to produce a corresponding color that is substantially similar to the determined color. The light producing element may include a liquid crystal display that is backlit by the LEDs. The light emitting element may be a color liquid crystal display.

The input an output may be detachably coupled.

Other features will be apparent from the description, the drawings, and the claims.

DESCRIPTION OF DRAWINGS

Like reference symbols in the various drawings indicate like elements.

DETAILED DESCRIPTION

As described in detail below, a system and a toy for use by a child or an adult produces, creates, mimics, emits or simulates a color associated with the toy's surroundings. The toy determines a color (e.g., any color in the visible spectrum including all primary colors, black, and white) detected from a medium in proximity to the toy and produces or emits a color based on the determined color.

Figure 1:
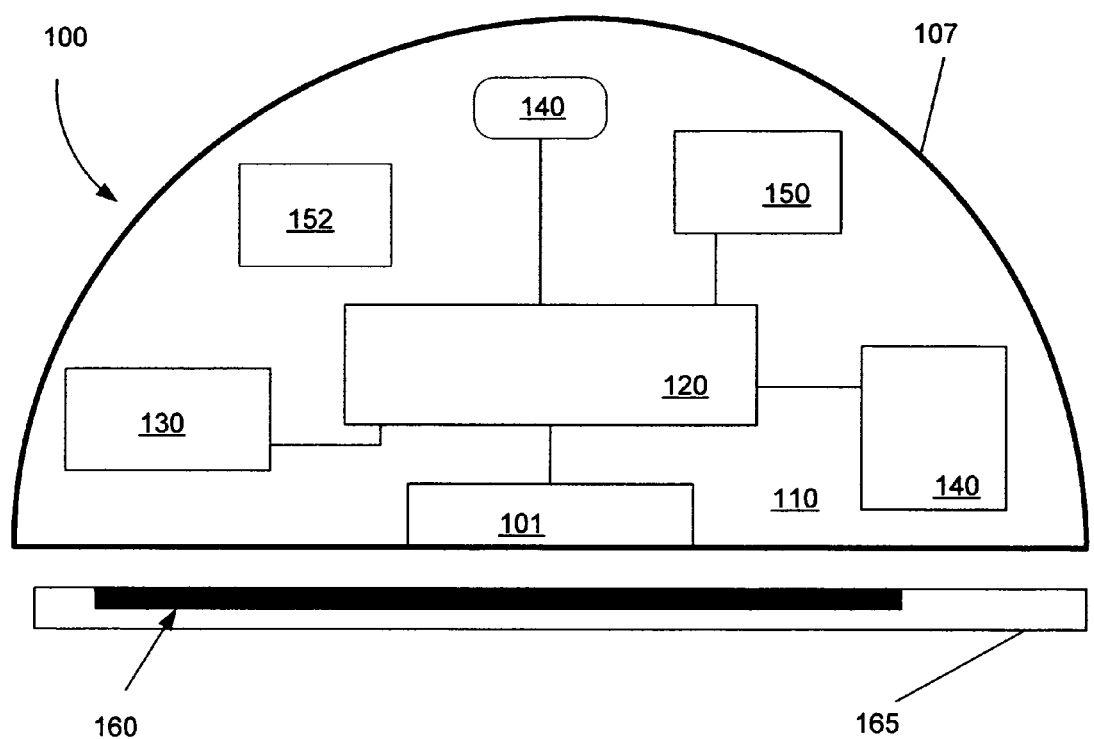
FIG. 1 is an exemplary block diagram of a toy system for detecting and producing color.

As shown in FIG. 1, a toy system 100 may be used by a child or adult. In one implementation, the system 100 includes a toy 101. The toy 101 includes a housing 107, a color reader 110, a processing device 120, a memory 130, a color generator 140, an input/output device 150, and a power supply 152.

The color reader 110 is used to sense or detect one or more colors 160 that are presented by a medium 165. Any visible color that may be presented by the medium 165 may be used (including all primary colors, black, and white) may be used with the system 100. The medium 165 may be formed using any materials that may passively or actively present color. For example, the medium 165 may be any article that actively produces color, such as, for example, a light, a monitor, or a display. Other examples include articles which passively produce visible color when light is reflected by the color 160 from the medium 165. The color 160 may be affixed to, applied to, placed, printed, painted, or laminated on, or permeated within a medium 165. Multiple colors may be arranged on the medium 165 in a predetermined or random fashion. In addition, the color 160 may be formed into one or more shapes, geometries, forms, contours, outlines, characters, images, words, objects, symbols, figures, other visual representation. In one implementation the medium 165 may be a game board, mat, or any other playing surface including one or more colored areas or portions.

The color reader 110 may be used to detect one or more colors 160. The color reader 110 is placed in proximity to a color 160 presented by the medium 165 to generate signals, information, or data that relate to the color 160. For example, color reader 110 may interpret light that is reflected from or produced by the color 160. The color reader 110 provides the signals or data to the processing device 120. The processing device 120 receives and processes the signals to determine the color 160 as explained in greater detail below.

The processing device 120 receives signals or color data from the color reader 110 and processes the color data to determine the color 160. The processing device 120 may be implemented using a general-purpose or a special purpose computer, such as, for example, a digital signal processor (DSP), a processor, a microcomputer, or a microprocessor capable of responding to and executing instructions in a defined manner. The processing device 120 may run one or more software applications to command and direct the processing device 120. The software applications may include a computer program, a piece of code, an instruction, or some combination thereof, for independently or collectively instructing the processing device 120 to operate as desired. The processing device 120 also may access, store, and create data in response to the applications.

The applications and data may be embodied permanently or temporarily in any type of machine, component, physical or virtual equipment, storage medium, or propagated signal wave capable of providing instructions to or being interpreted by the processing device. In particular, the applications or data may be stored by a storage medium or memory 130 including volatile and non-volatile memories (e.g., a read only memory (ROM), a random access memory (RAM), a flash memory, a floppy disk, a hard disk, a compact disk, a tape, a DROM, a flip-flop, a register, an SRAM, DRAM, PROM, EPROM, OPTROM, EEPROM, NOVRAM, or RAMBUS), such that if the memory 130 is read by the processing device 120, the specified steps, processes, and/or instructions are performed. The memory 130 may include an interface, such that data and applications may be loaded and stored in the memory 130 allowing the applications, programming, and color data to be updated, changed, or augmented. The memory 130 also may be removable, such as, for example, a card, a stick, or a disk that is inserted in or removed from the toy 101. As a result, the memory 130 may accommodate different color sets, data, and/or programs to allow the processing device 120 to be adapted to different modes, games, situations and/or scenarios, as explained in further detail below.

Once the processing device 120 determines the color 160, the processing device 120 controls the light emitting element 140 to generate or emit light of a desired color. For example, the desired color may be the same as or substantially similar to the detected color, or the produced color may be another color (such as a complementary or contrast color). In addition, two or more detected colors may be used to produce another color. For example, the color reader 110 may be used to detect two colors, such as blue and yellow to produce a third color, such as green. The light emitting element 140 may include two or more light emitting diodes (LEDs) which are controlled by the processing device 120. The intensity of each LED is controlled by the processing device such that the color of light emitted by each LED is mixed to produce one overall perceived color of light corresponding to the desired color.

For example, the intensity of each light may be controlled by using a modulation technique, such as pulse width modulation, to rapidly turn on and off each LED over a duty cycle (faster than is perceived by the human eye). Combinations of intensities of each LED produce a single perceived color emitting form the light emitting device. Light intensity values for each LED that correspond to desired color may be stored in and read from the memory device 130. Other light sources also may be used, such as, for example, incandescent lights, fiber optic lights, and a color liquid crystal display (LCD). For example, one or more color LCDs may be used to implement the light emitting element 140. In addition, one or more LCDs may be used to implement the color emitting element 140 and backlit with a colored light produce by color mixing two or more colored light sources (e.g., generated from two or more color LEDs). The overall desired color emitted from the light element 140 may be continuous, semi-continuous, in a sequence, pattern, or strobe of one or more desired colors.

The housing 107 may include in one or more pieces that may be formed, shaped, or assembled into a toy or a game piece. In one implementation, the housing and/or one or more pieces forming the housing 107 may be made of translucent, transparent or semi-transparent, clear, or semi-opaque material, such as, for example, plastic, glass, or any other material that allows light to pass through or emit from the housing 107. As a result, when the light emitting element 140 is controlled by the processing device 120 to emit a desired color light, the housing 107, a portion of the housing 107, or one or more pieces of the housing 107 (e.g., the eyes of a creature) present the desired color to the user. For example, when the toy or game piece 101 is placed in proximity to the color green, the toy or game piece 101 appear to glow green.

The processing device 120 also may include one or more user interfaces 150 allowing a user to interact with or program the toy 101 using the processing device 120. The user interface 150 may include one or more input devices, such as, for example, keys, buttons, switches, knobs, and levers, in addition to keypads, keyboards, and touch screens. The user interface 150 also may include one or more lights or displays or speaker to provide information to a user. For example, the display may present information to the user including processing device operating information (e.g., status, on, off, and modes) in addition to programming information (e.g., selections, menus, lists, and options). The user interface 150 may be used to power on/off, program, and/or calibrate the processing device 120 and color reader 110, as explained in further detail below.

The toy 101 also may include one or more power sources 152 to provide power to one or more elements of the toy 101 (e.g., color reader 101, the processing device 120, the memory 130, the light emitting element 140, and the user interface 150). The power source 152 may be internal or external and replaceable (e.g., one or more batteries). In one implementation, the processing device 120 may provide a time out feature which places the device in a standby, sleep, or off mode to conserve power.

Figure 2:
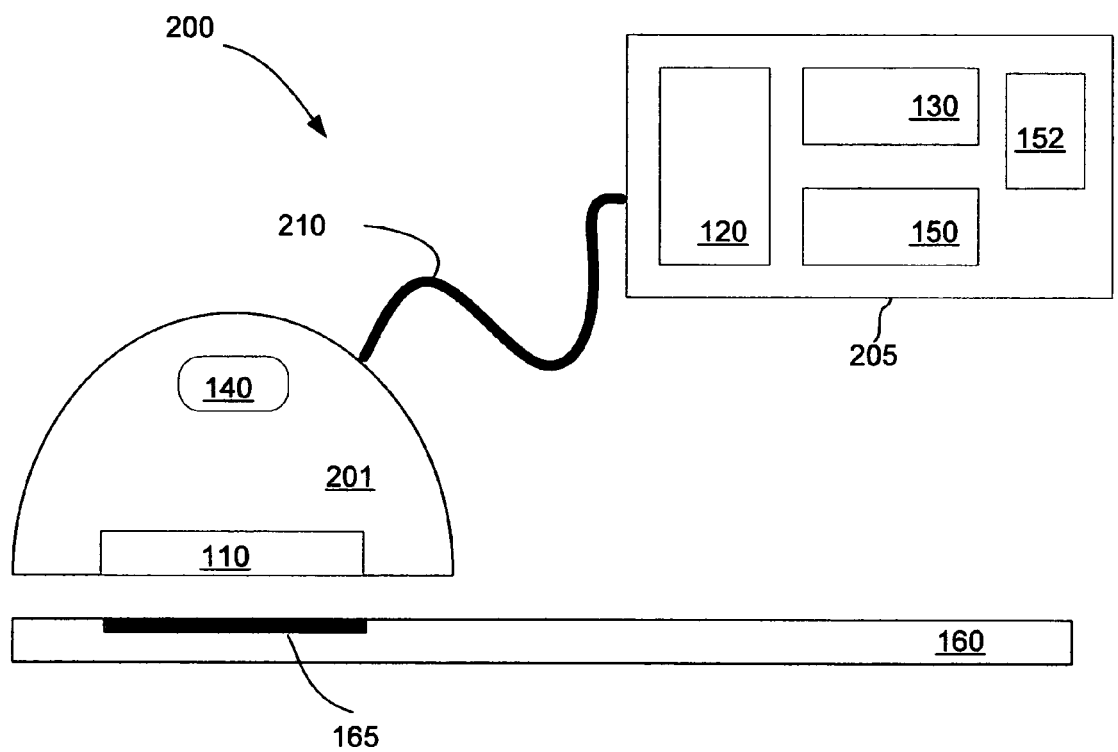
FIG. 2 is an exemplary block diagram of a toy system for detecting and producing color.

In another implementation, as shown in FIG. 2, the toy system 200 may include a toy 201 and a separate module 205 connected by a link 210 (e.g., a cable or cord). The system 200 and its components function in a similar manner as described above for system 100 as shown in FIG. 1; however, some of the components (e.g., the processing device 120, memory 130, and user interface 150 may be located in the separate module 205 and the toy 201 includes the color reader 101 and the light emitting element 140. The color reader 101 provides the color data to the processing device 120 and the processing device 120 controls the light emitting element 140 through the link 210. The link 210 may be detachable allowing different toys 201 to be interchanged and/or connected to the module 205.

Of course, other configurations also may be used. For example, the processing device 120 may be implemented in either the module 205 or the toy 201. In addition, the module 205 and the toy 201 each may include a processing device 120. Furthermore, the link 210 may be implemented as an interface allowing the module 205 and toy 201 to be physically linked or interfaced together at one time, and the be detached or separated at another. The link 210 also may be implemented a wireless connection between (e.g., infrared or radio frequency) including a receiver and transmitter or transceiver. Both the toy 201 and the module 205 may be provided with a separate power source 152. Further example, of various configurations are described below.

Figure 3:
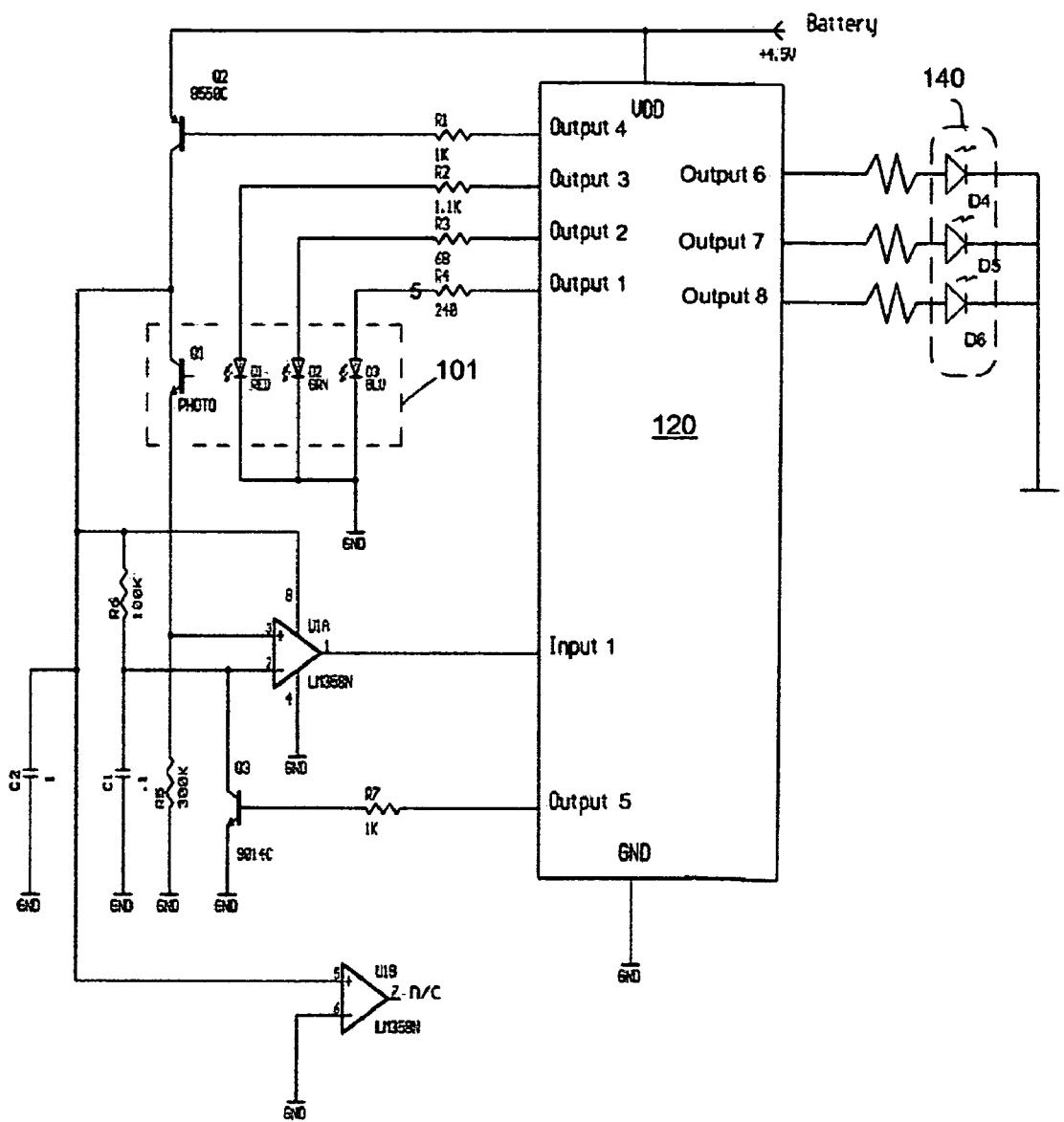
FIG. 3 is an exemplary circuit diagram for a toy for use in the systems of FIGS. 1 and 2.

FIG. 3 shows one implementation of a circuit diagram 300 for the toy 101 for use in the systems 100 and 200 of FIGS. 1 and 2. In one implementation, a color reader 110 includes at least one visible light photo detector Q1 and at least three light emitting diodes (LEDs) D1, D2, and D3. The LEDs may be implemented using different colors, for example, red D1, green D2, and blue D3. Each of the LEDs is connected by a resistance to an output of the processing device 120 (e.g., output 1, output 2, and output 3). Each of the LEDs D1, D2, and D3 may illuminate the color sample with their respective colored light, one at a time, under control of the processing device 120 (e.g., by placing a high potential on a respective output 1, 2, or 3). The amount of light reflected from the color sample is measured by use of the photo detector Q1. The photo detector Q1 is connected in series between a switch Q2 and pin 2 of an operational amplifier UA1. An analog to digital conversion is provided by an RC network using capacitor C1 and resistor R6 connected in series. The high potential of resistor R6 is connected to a switch Q2 and pin 8 of the amplifier U1A. The high potential of capacitor C1 is connected to pin 2 of the amplifier U1A. The output of the amplifier U1A (i.e., pin 1) is connected to input 1 of the processing device 120. The switch Q2 is connected in series with the photo detector Q1 and is connected to output 4 of the processing device 120 and a power source. The switch Q2 may be used to power on and off the circuit of FIG. 3. In addition, the switch Q2 may be used to place the circuit in a sleep mode, for example, to conserve battery power.

To begin determining a color, one of the LEDs is illuminated and the switch Q2 is enabled by output 4 of the processing device 120. Once enabled, the capacitor C1 begins to charge. The processing device 120 measures the amount of time it takes for capacitor C1 to be charged through resistor R6. When the voltage on C1 reaches the same potential as the voltage on pin 3 of amplifier U1A, pin 1 is enabled with a high potential switching from a high potential to a low potential on input 1 of the processing device 120 and time measurement by the processing device 120 is stopped. The circuit may be reset for each measurement and the capacitor C1 may be discharged for each measurement using switch Q3 connected between the capacitor C1 and a ground and operated by output 5 of the processing device 120. In one implementation, after switch Q2 is activated to power up the circuit, the processing device 120 may wait for the circuit to reach equilibrium and then use switch Q3 to discharge any residual potential on C1 before beginning the first measurement.

As each of the three LEDs D1, D2, and D3 is illuminated in turn, a corresponding time measurement is made by the processing device 120. Each time measurement provides an indication of how much of each of the primary colors (e.g., red, green, and blue) is present in the color sample. Of course other methods of color detection may be used. For example, an LED emitting white light may be used in conjunction with three photo detectors with associated color filters (e.g., red, green, and blue) to measure the amount of each primary color reflected from the color sample.

The processing device 120 compares the measured time values to predetermined values stored in memory 130 for each of the colors that are to be identified by the processing device 120 to determine the closest match. Once the closest match is determined, the processing device 120 controls the light emitting element 140 to produce a color. The light emitting element 140 may include three LEDs D4, D5, and D6. The LEDS may be implemented using different colors, for example, red D4, green D5, and blue D6. Each LED is connected by a resistance to an output of the processing device 120 (e.g., output 6, 7, and 8, respectively). Using the determined color, the processing device 120 may access data in the memory (e.g., color intensity values) for each of the LEDs. Using a modulation technique, such as, for example, pulse width modulation (PWM), the processing device 120 may control the intensity of each LED such that the each LED is turned on for a portion or percentage of a duty cycle. By using different intensities for each LED, the combined emitted light from each LED presents a different overall color based on the determined color.

Figure 4:
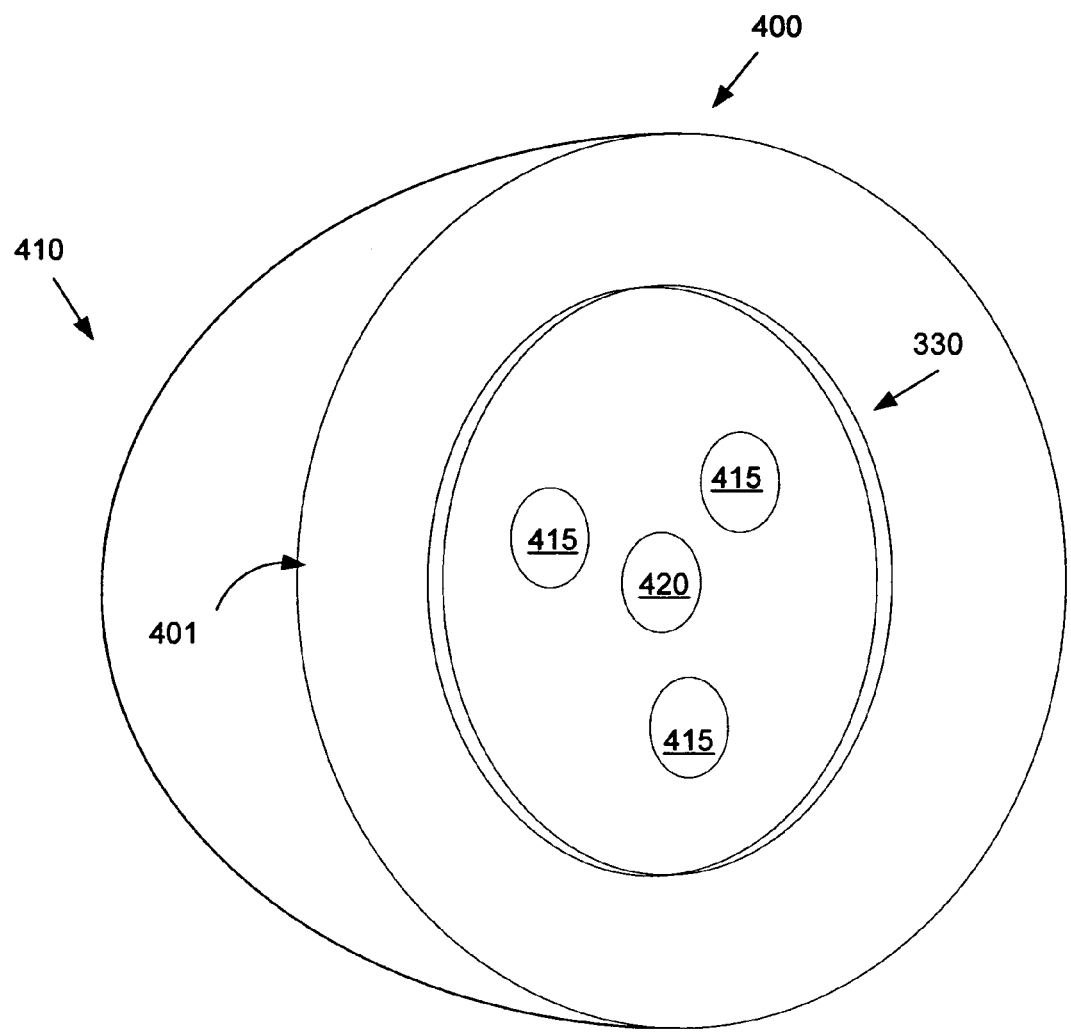
FIG. 4 is an exemplary arrangement of a color reader in a toy for use in the systems of FIGS. 1 and 2.

FIG. 4 shows a toy 400 with one exemplary configuration of exterior arrangement of LEDs of the color reader 110 on a surface 401 of the housing 407. To provide more accurate measurements of the primary colors reflected from the color sample, the amount of outside or ambient light may be reduced when measuring the color sample. For example, the area 409 including the LEDs 415 and photo detector 420 may be substantially flush with the surface or slightly recessed to reduce the amount ambient light. In another example, a small wall or ridge 410 may be provided around the area 409 as an extension to the surface 401. The wall 410 surrounds the LEDs 415 such that when the wall 410 is placed in close proximity to or on the color sample, the amount of ambient light registered by the photo detector 420 is significantly reduced or substantially eliminated.

In one example, the amount of light may be continually measured by the photo detector 420 with all three LEDs 415 off. Whenever the amount of light measured by the photo detector 420 falls below a predetermined amount, the measuring process described above is begun. Alternatively, a proximity mechanism or sensor, such as, for example, a pressure sensitive mechanism may be used to indicate the color reader 110 is in close proximity to color sample and measurement may begin. In one implementation, the wall 410 or small button or switch may be spring loaded and depressed into the housing 407 engaging an electrical contact to start the measurement process when the surface 401 is placed against a surface bearing the color sample. Of course, a simple switch or button also may be provided by the user interface 150.

To provide more accurate readings, the processing device 120 may be calibrated, for example, after a battery or power source 152 has been engaged or replaced, by placing the color reader 101 over a white surface and engaging a calibration function (e.g., pressing a calibrate button provided on the color reader 101 or in the interface 150). Calibration provides more accurate reading and tolerances in the LEDs, photo sensors, and other components. The calibration information may be stored by the memory 130 and used by the processing device 120 when determining a color.

Figure 5:
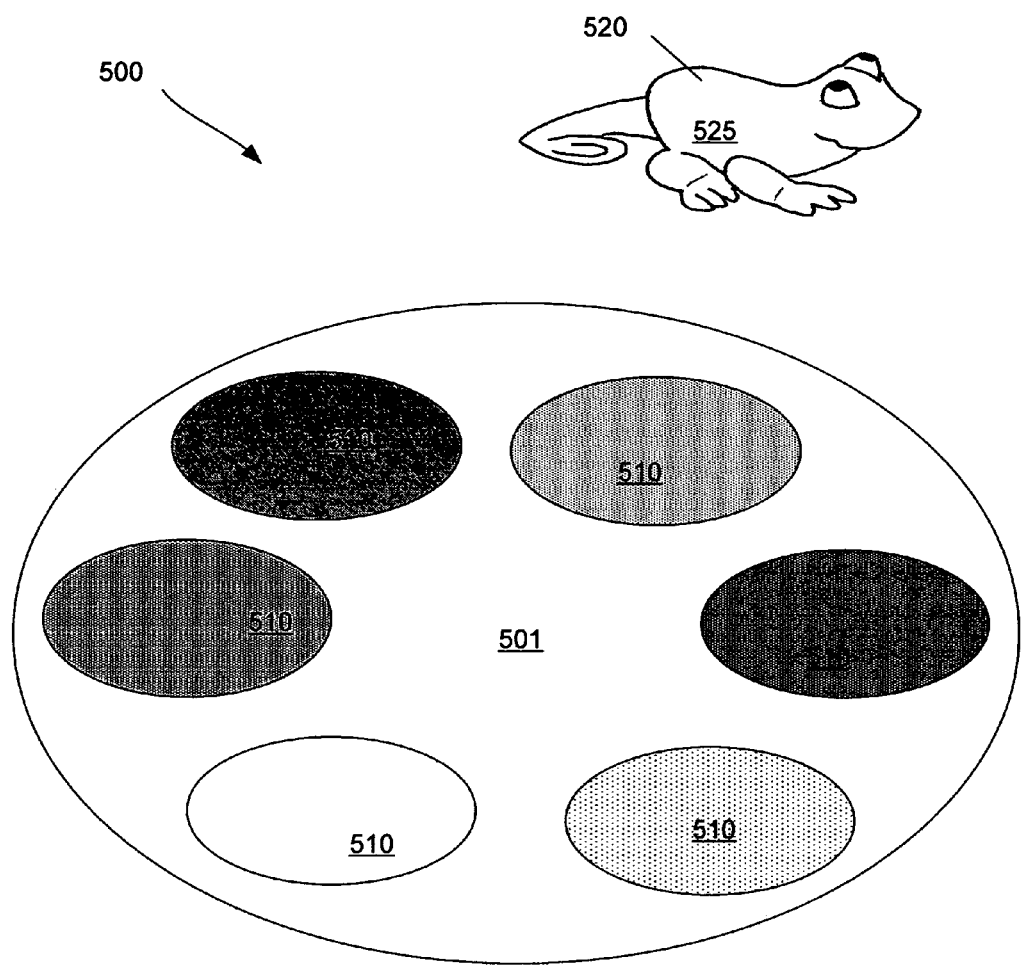
FIG. 5 is an exemplary toy game system.
Figure 6:
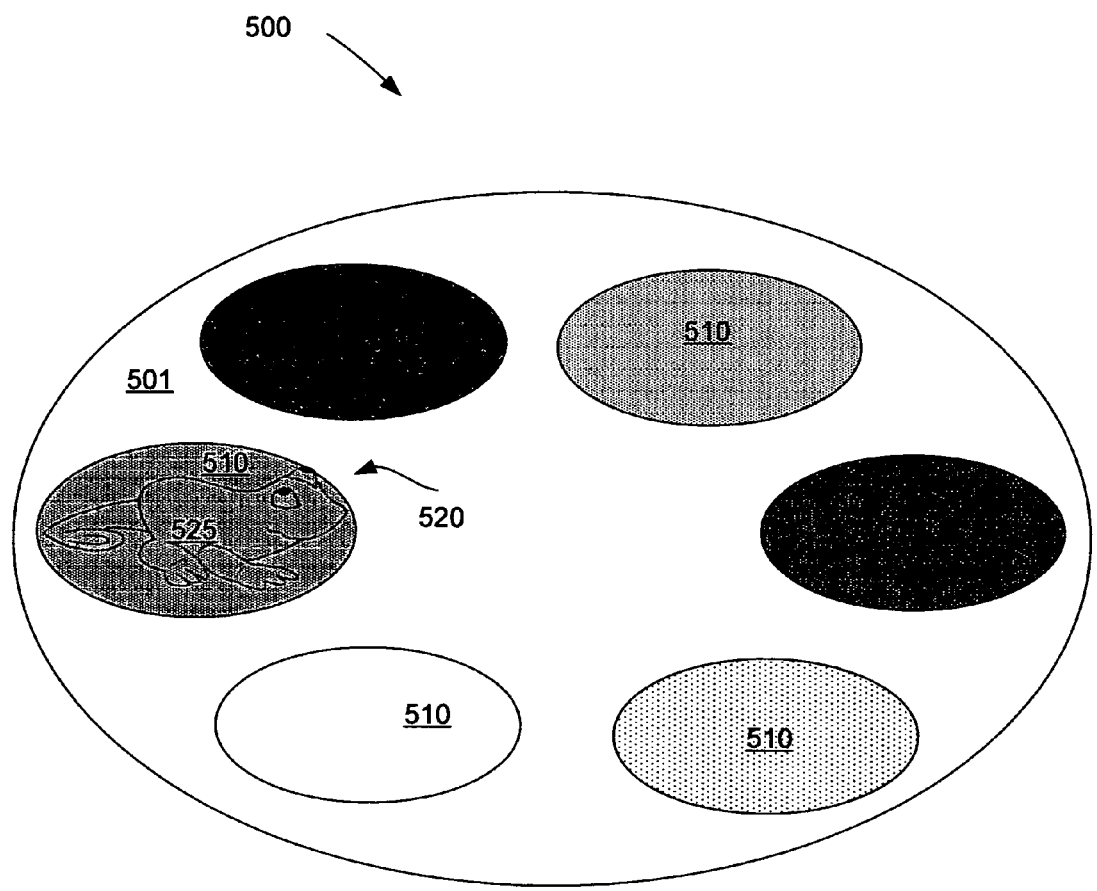
FIG. 6 is an exemplary toy game system.

FIGS. 5 and 6 show one example of a game system 500. The game system 500 includes a playing surface 501 with one or more colored areas 510. The colored areas 510 may be formed using any visible colors and may be formed in any desired shape. A toy 520 also is provided. The toy 520 includes a housing 525 to protect the internal components of the toy 520 (e.g., a color reader 101, a processing device 120, a memory 130, a light emitting element 140, and a user interface 150). The housing 525 may be shaped into any form or object, such as, for example, a chameleon with a head, eyes, legs, and a tail. When the toy 520 is powered on, it may radiate one or more colors (e.g., a rainbow of colors) to indicate the toy 520 is operational. When activated (e.g., powered on) and the toy 520 is placed in proximity to one of the colored areas 510 of the playing surface 501, as shown in FIG. 6, the processing device 120 determines the color of the colored area 510 using the color reader 101. For example, after determining the colored area 610 is "red," the processing device 120 causes the light emitting element 140 to produce the color "red." As a result, the entire housing of toy 520 or a specific part or parts (e.g., a head, a tail, the eyes) of the toy emits or glows a color (e.g., red) that is the same as, or substantially similar to the color of the colored area 510 of the playing surface 501. In one implementation, multiple color emitting devices 140 may be used to cause different portions of the toy to emit different colors (e.g., a green body with red eyes).

The toy 520 may be used to play any number of games. For example, the toy 520 may indicate a color (e.g., by emitting the color, and/or presenting the color using a display and/or speaker). The player may be "asked" (e.g., via a speaker and/or display associated with the user interface) to place the toy 520 on the indicated color (e.g., "Place me on the color red"). If the toy 520 is placed on the correct color, the toy 520 may indicate the result through a display or audible speaker ("Yes, that's red! Wow, you're good"). In addition, the processing device 120 may cause the light emitting device 140 to present a color causing the housing 525 of the toy 520 (or specific parts of the housing 525) to match the color of the colored area 510 (e.g., as shown in FIG. 6). The same or a different user may then be required to place the toy 520 on another colored area 510. If the toy 520 is place on the wrong color (e.g., green), the toy 520 may indicate that the color is not correct ("Sorry, that's the color green") and give the player a second chance (e.g., "I like green but can you find the color red?") or the player may lose their turn and a new player may attempt to place the toy 520 on a correct color.

Another game may request that the user place the toy 520 on a secret color that the toy is "thinking off" (e.g., the processing device 120 may randomly or specifically choose a color). The toy 520 then indicates it is thinking of a color ("I'm thinking of my favorite color. Can you place me on it?"). Once the user places the toy 520 on a color, the processing device 120 determines if the color corresponds to the secret color. If so, the toy 520 indicates a correct guess has been made (e.g., "Wow, how did you know I love red"). If not, the toy 520 indicates the choice is wrong (e.g., if placed on pink the toy may indicate "While I'm ticked pink, he, he, he, that's not the secret color"). Additional attempts may be provided ("Can you guess again). In addition, the toy 520 may provide clues to help the user guess the color (e.g., "I'll give you a clue; it's the same color as a fire engine").

In another exemplary game, the toy 520 may present or emit a sequence of two or more colors. A user must then place the toy on each colored area 510 in the same order as the sequence provided. As the toy 520 is placed on each colored area 510, the processing device 120 determines if the color matches the sequence and causes the detected color to be produced by the toy 520. If the entire sequence is performed correctly, the toy 520 may indicate success (e.g., through a speaker and/or display). Once a sequence is completed correctly a score may be increased of the player correctly performing the sequence. After performing the sequence, a new sequence may be provided. The new sequence may have the same, an increased, or a decreased difficulty. For example, the new sequence may be the same length, longer, or shorter. In one example, a new color may be added to the previous sequence to make it longer. If the sequence is not performed correctly, the toy 520 may indicate the sequence was incorrect and there may be a consequence, such as, for example, a new player may be asked to attempt the same or a different sequence, or the same player may be given one or more opportunities to complete the sequence.

Figure 7:
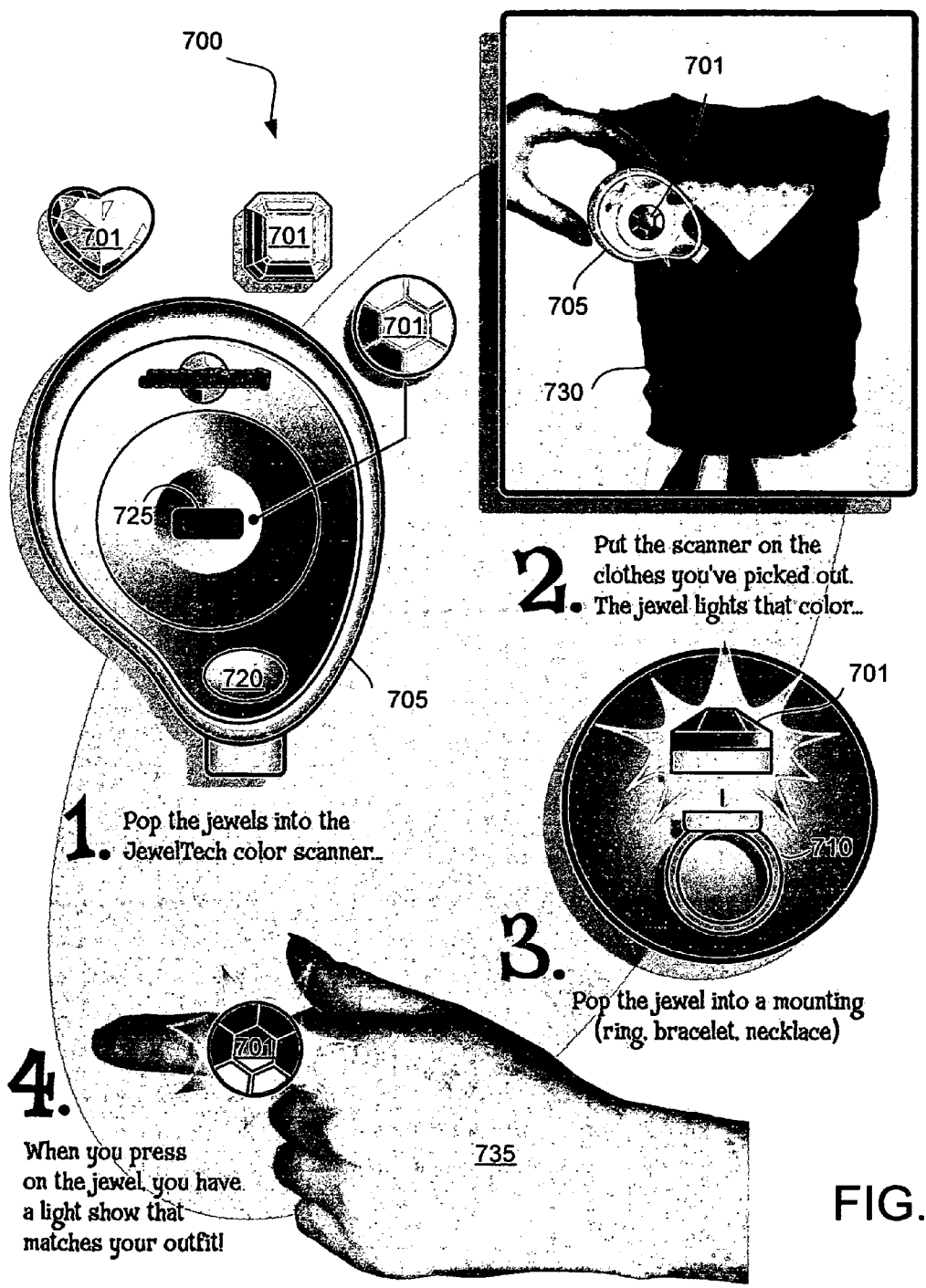
FIG. 7 is exemplary toy jewelry for detecting and producing color.

FIG. 7 shows another exemplary embodiment 700 for toy jewelry. The toy jewelry may include one or more jewels 701, a control module 705, and a base 710. The jewels 701 may be formed in any number of shapes to mimic toy jewels or stones. The jewels 701 may include a light emitting element 140 (e.g., inside a transparent or semitransparent housing 715), a circuit including a storage medium (such as a register or flip flop), a power source (e.g., a battery) and an interface allowing the circuit to be programmed by the module 705. The module 705 may include a color reader 101, a processing device 120, a memory 130, an interface 150 including a button 720 and an interface 725. The interface 725 may mate with the interface of any one of the jewels 701 by placing the jewel 701 on the module 705. The base 710 may be implemented as part of toy jewelry and may be formed as any number of pieces, such as, for example, a ring (as shown), necklace, a broach, a bracelet, an ear ring, a watch, or an anklet and include a receptacle to receive the jewels 701. When the jewel 701 is placed in the module 705, the module 705 may read a color (e.g., of an outfit) using the color reader 101 when a user presses the button 720 of the user interface 150. The processing device 120 programs the circuit of the jewel 701 to control the light emitting element 140 to output the determined color, a complementary color, a contrasting color, or other color. For example, the module 705 may be placed next to a red shirt 703 and the jewel 701 may be programmed to display the color red. The circuit of the jewel 701 may include an additional processing device 120 to control the light emitting element. In one example, the jewel 701 may include a color liquid crystal display (LCD) to produce the determined color or an LCD that is backlit by a colored light source (e.g., two or more color LEDs). The jewel 701 may then be removed from the module 705 and placed in the base 710 and worn as toy jewelry (e.g., a on finger 735). Other configurations, as described above, also are possible. For example, the processing device 120 may be located in the jewel 701 rather than the module 205. Furthermore, the interface may be wireless.

A number of exemplary implementations have been described. Nevertheless, it will be understood that various modifications may be made. For example, suitable results may be achieved if the steps of described techniques are performed in a different order and/or if components in a described components, architecture, or devices are combined in a different manner and/or replaced or supplemented by other components. Accordingly, other implementations are within the scope of the following claims.

What is claimed is:

1. A toy for producing color comprising:
a housing formed in the shape of a toy;
a color reader to read a sample and generate data;
a processing device to process the generated data and determine a color of the sample based on the generated data; and
a light emitting element to produce light corresponding to the determined color.

2. The toy of claim 1 wherein light emitting element includes two or more light emitting diodes (LEDs) of different colors and the processing device controls the intensity of each LED to cause the light emitting element to produce the corresponding color that is substantially similar to the determined color.

3. The toy of claim 2 wherein the color reader and the light emitting element both include at least three LEDs, a first LED to emit red light, a second LED to emit green light, and a third LED to emit blue light.

4. The toy of claim 2 wherein the light emitting element includes a liquid crystal display that is backlit by the two or more LEDs.

5. The toy of claim 1 wherein the color reader further comprises one or more light emitting diodes (LEDs) to emit light on the sample and a photo detector to measure light reflected and produce the generated data.

6. The toy of claim 5 wherein the processing device is configured to cause the one or more LEDs to emit the light and begin a timer, to stop the timer based on a signal generated by the photo detector, and to determine the color based on the time measured by the timer.

7. The toy of claim 1 wherein the processing device is configured to be calibrated by engaging the color reader when placed next to a white color sample, to store the generated data from the white color sample, and to use the stored, generated data to determine the color of the sample.

8. The toy of claim 1 wherein the housing is made of a transparent or semi transparent material that allows light to pass through the housing such that when the light emitting device produces a colored light the toy radiates the produced color.

9. The toy of claim 1 wherein the housing is formed in a shape depicting a creature.

10. The toy of claim 1 wherein the housing is shaped in the form of a game piece and the sample is a colored portion of a game playing surface.

11. The toy of claim 1 wherein the housing is shaped in the form of toy jewelry.

12. The toy of claim 1 further comprising a user interface to program the processing device.

13. The toy of claim 1 further comprising a memory to store color data wherein the memory is one of a card, a stick, and disk and the memory may be inserted in and removed from the toy to change the programming of the toy.

14. The toy of claim 1 wherein the light emitting element is a color liquid crystal display.

15. A toy game system comprising:
a playing surface comprising one or more colored areas; and
a toy game piece comprising:
a housing;
a color reader to generate data based on the color of the one or more colored areas;
a processing device to process the generated data and determine the color of the one or more colored areas based on the generated data; and
a light emitting element to produce light substantially similar to the determined color.

16. The toy game system of claim 15 wherein light emitting element includes two or more light emitting diodes (LEDs) of different colors and the processing device controls the intensity of each LED to cause the light emitting element to produce the corresponding color that is substantially similar to the determined color.

17. The toy game system of claim 16 wherein the color reader and the light emitting element both include at least three LEDs, a first LED to emit red light, a second LED to emit green light, and a third LED to emit blue light.

18. The toy game system of claim 15 wherein the color reader further comprises one or more light emitting diodes (LEDs) to emit light on the one or more colored areas and a photo detector to measure light reflected from the one or more areas and produce the generated data.

19. The toy game system of claim 18 wherein the processing device is configured to cause the one or more LEDs to emit the light and begin a timer, to stop the timer based on a signal generated by the photo detector, and to determine the color based on the time measured by the timer.

20. The toy game system of claim 15 wherein the housing is made of a transparent or semi transparent material that allows light to pass through the housing such that when the light emitting device produces a colored light the game piece radiates the produced color.

21. The toy game system of claim 15 wherein the game piece includes a user interface to program the processing device.

22. The toy game system of claim 15 wherein the game piece includes a memory to store color and game data wherein the memory is one of a card, a stick, and disk and the memory may be inserted in and removed from the game piece to change the programming of the game piece.

23. The toy game system of claim 15 wherein the processing device is configured to give instructions to a user on how to interact with the playing surface.

24. A toy for producing color comprising:
a module including:
a color reader to read a sample and generate data;
a processing device to process the generated data and determine a color of the sample based on the generated data;
an output to provide determined color data; and
a housing including:
an input to receive the determined color data;
a light emitting element to produce colored light corresponding to the determined color data.

25. The toy of claim 24 wherein the housing is formed in the shape of toy jewelry.

26. The toy of claim 24 further comprising:
toy jewelry including a receptacle;
wherein the housing is in the form of a jewel to be received in the receptacle of the jewelry.

27. The toy of claim 26 wherein the housing further includes a second processing device to receive the determined color data and to cause the light emitting element to produce the colored light.

28. The toy of claim 24 wherein light emitting element includes two or more light emitting diodes (LEDs) of different colors and the processing device controls the intensity of each LED to cause the light emitting element to produce a corresponding color that is substantially similar to the determined color.

29. The toy of claim 28 wherein the light producing element includes a liquid crystal display that is backlit by the LEDs.

30. The toy of claim 24 wherein the light emitting element is a color liquid crystal display.

31. The toy of claim 24 wherein the input an output may be detachably coupled.

32. A toy for producing color comprising:
a module including:
a color reader to read a sample and generate data;
an output to provide the generated color data; and
a housing including:
an input to receive the generated color data;
a processing device to process the generated color data and determine a color of the sample based on the generated data;
a light emitting element to produce colored light corresponding to the determined color data.

33. The toy of claim 32 wherein the housing is formed in the shape of toy jewelry.

34. The toy of claim 32 further comprising:
toy jewelry including a receptacle,
wherein the housing is in the form of a jewel to be received in the receptacle of the jewelry.

35. The toy of claim 32 wherein the light emitting element includes two or more light emitting diodes (LEDs) of different colors and the processing device controls the intensity of each LED to cause the light emitting element to produce a corresponding color that is substantially similar to the determined color.

36. The toy of claim 35 wherein the light producing element includes a liquid crystal display that is backlit by the LEDs.

37. The toy of claim 32 wherein the light emitting element is a color liquid crystal display.

38. The toy of claim 32 wherein the input an output may be detachably coupled.

* * * * *